Dec. 11, 1934.  K. SIEG  1,984,039
CHANGE SPEED GEARING
Filed Dec. 14, 1932  8 Sheets-Sheet 3
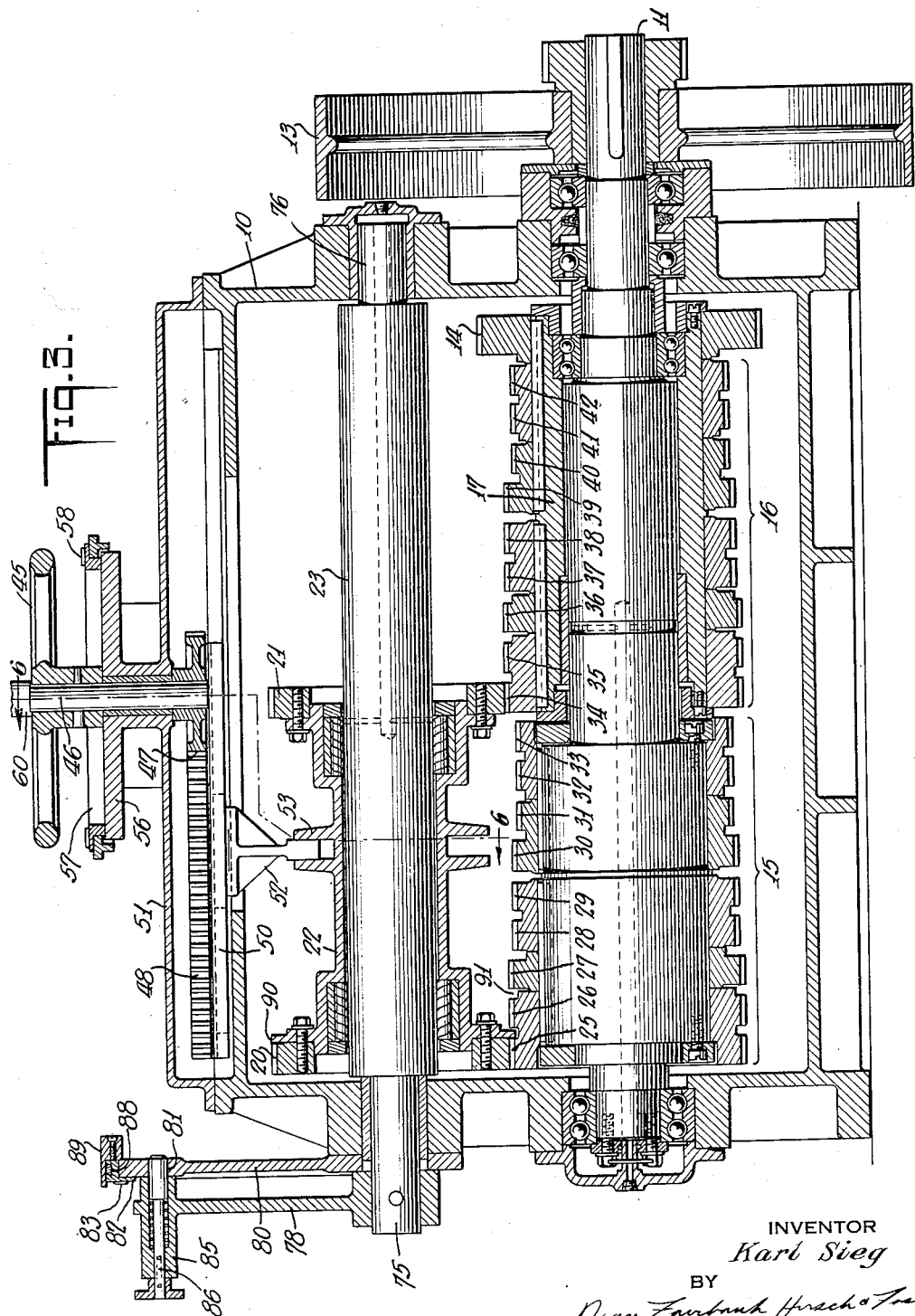
INVENTOR
*Karl Sieg*
BY
ATTORNEYS Dec. 11, 1934.    K. SIEG    1,984,039
CHANGE SPEED GEARING
Filed Dec. 14, 1932    8 Sheets-Sheet 4
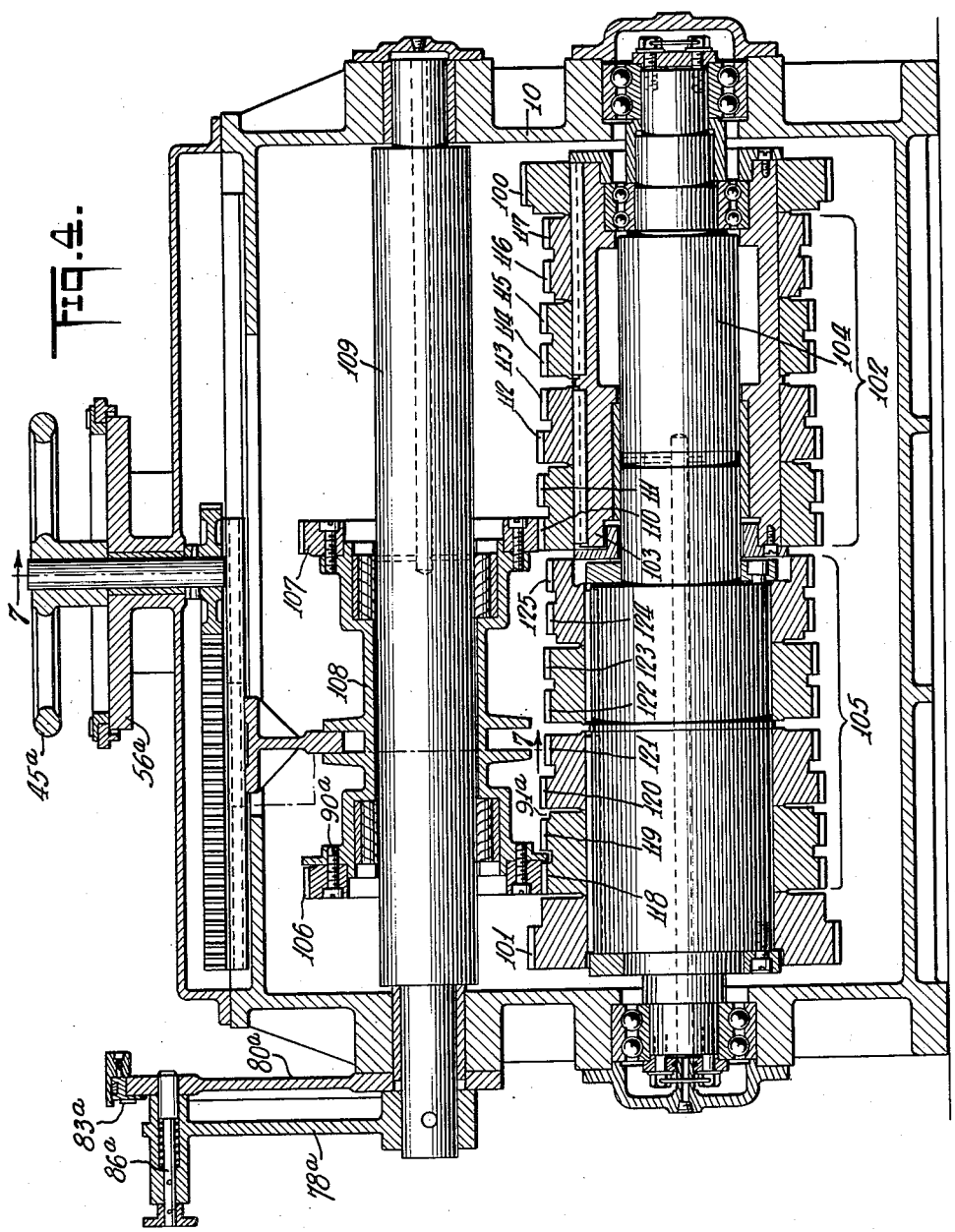
INVENTOR
Karl Sieg
BY
Dean Fairbank Horsch & Foster
ATTORNEYS

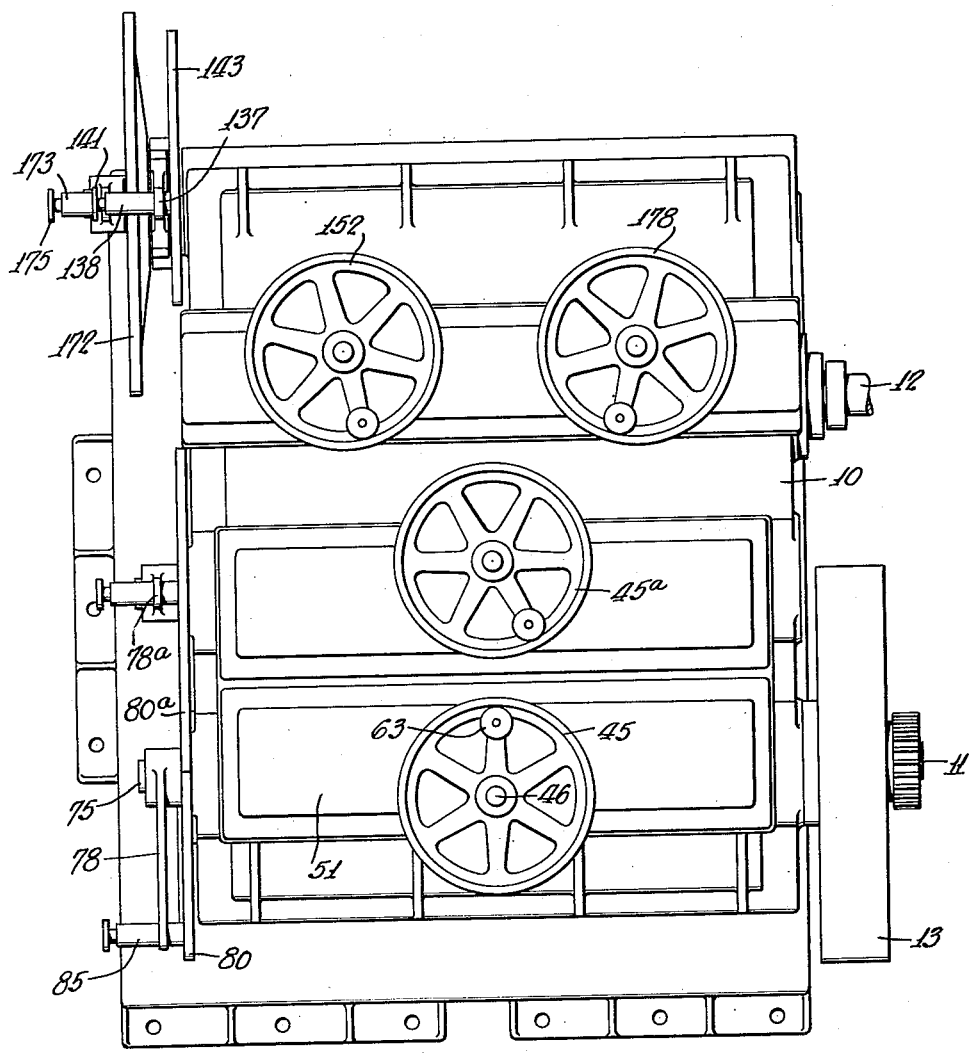

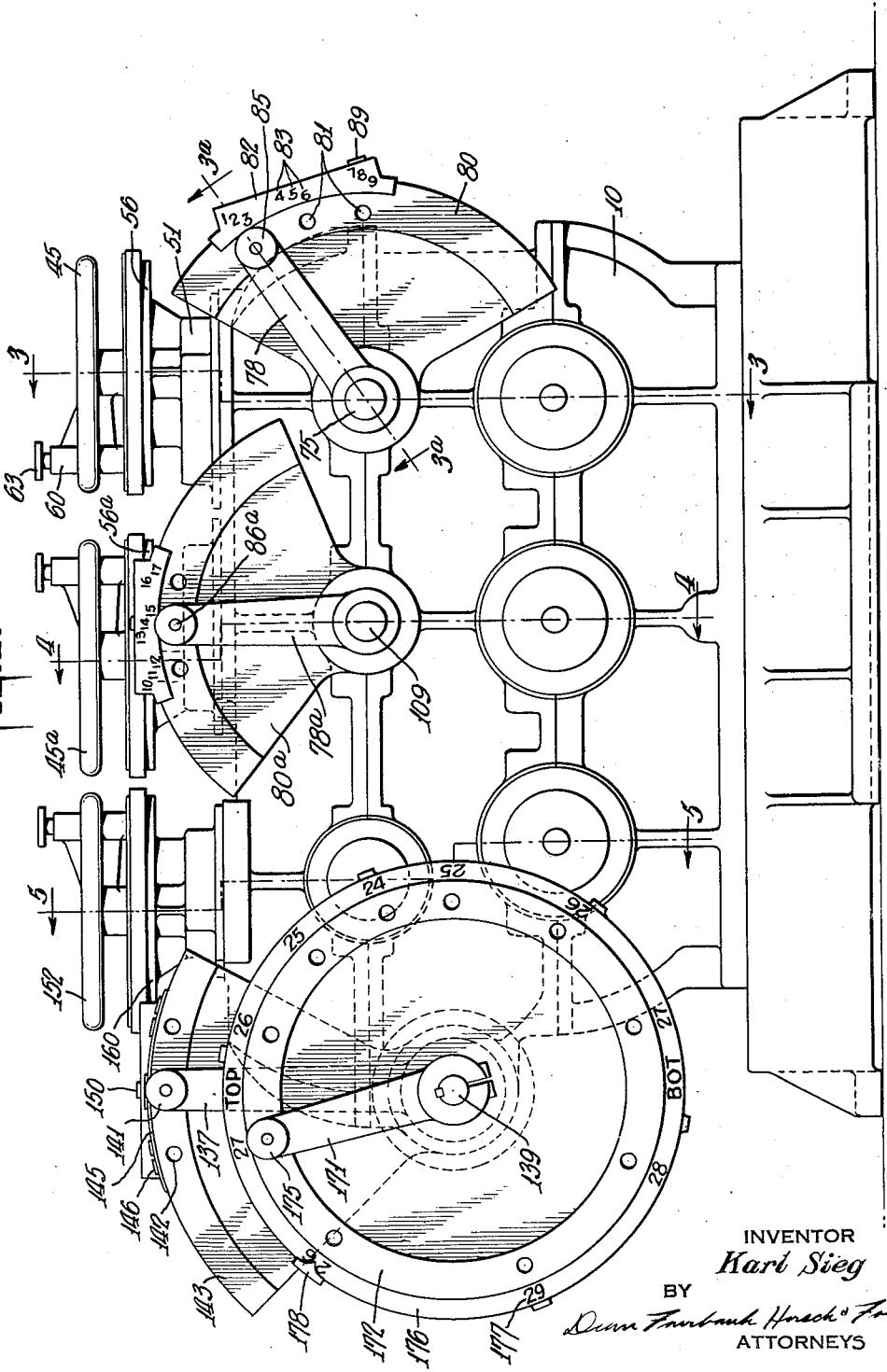

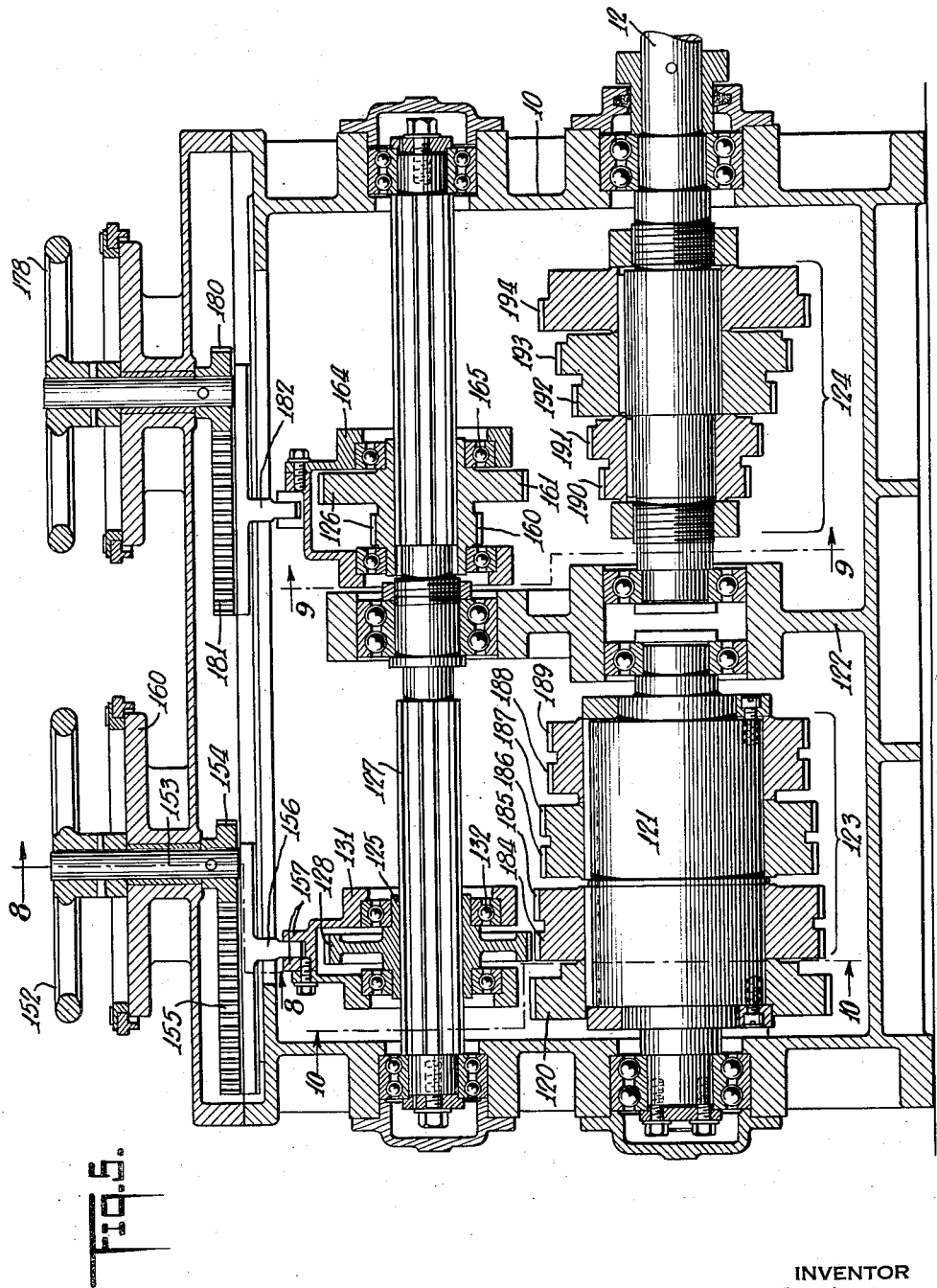

Dec. 11, 1934.　　　K. SIEG　　　1,984,039
CHANGE SPEED GEARING
Filed Dec. 14, 1932　　8 Sheets-Sheet 6
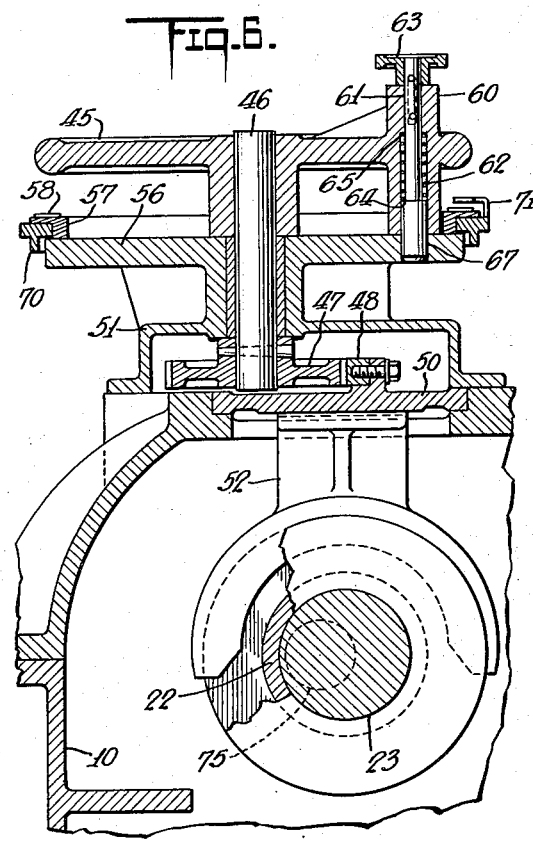
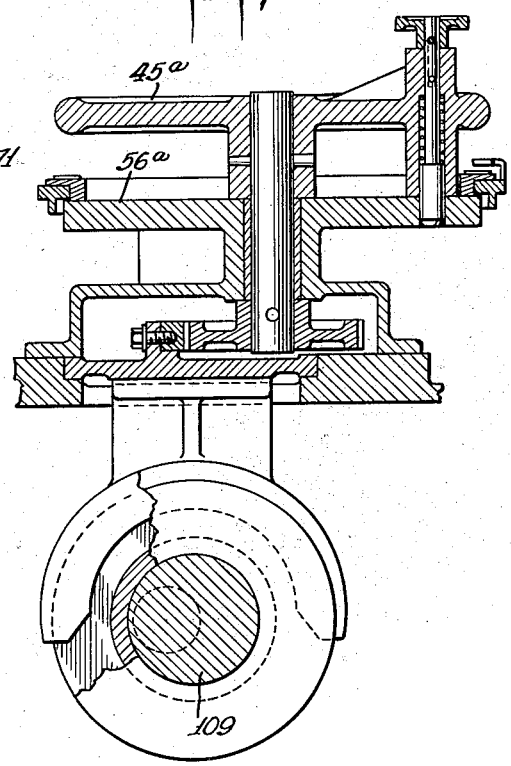
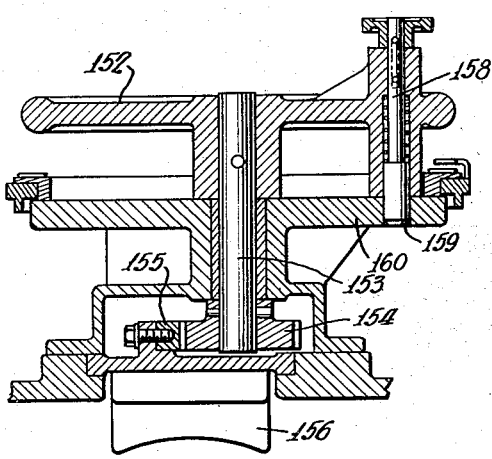
INVENTOR
Karl Sieg
BY
ATTORNEYS

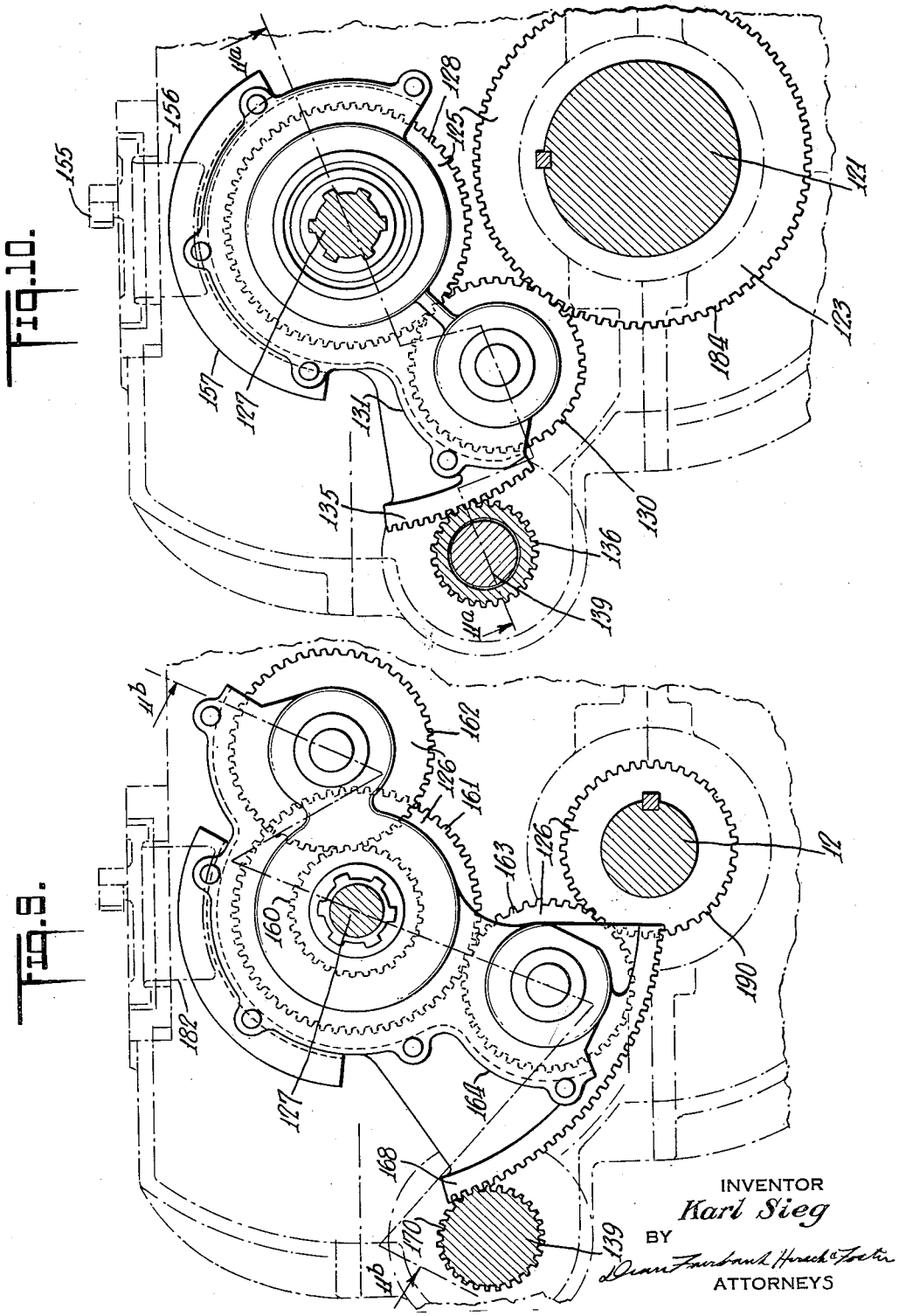

Dec. 11, 1934.  K. SIEG  1,984,039
CHANGE SPEED GEARING
Filed Dec. 14, 1932  8 Sheets-Sheet 8
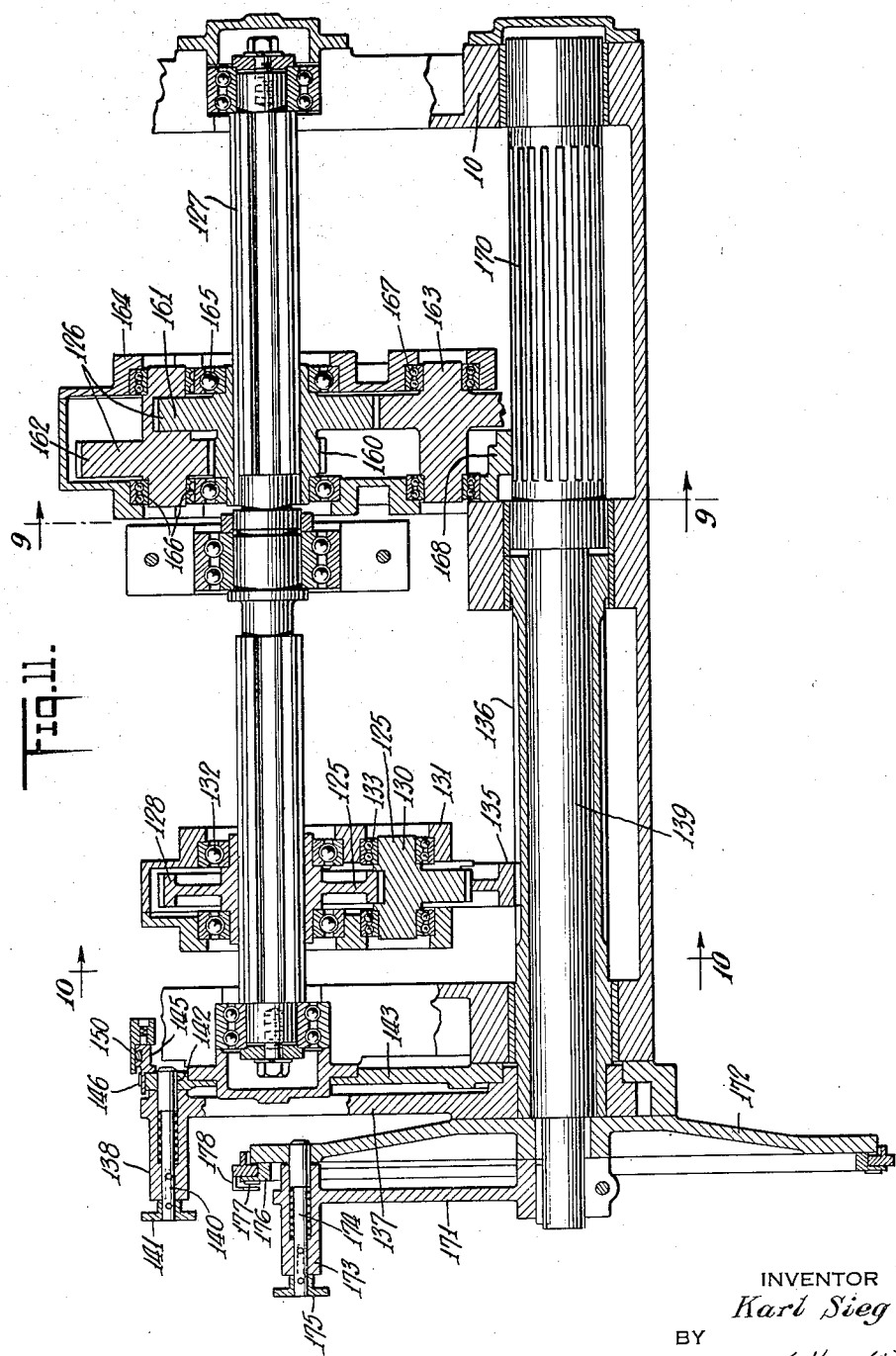
INVENTOR
*Karl Sieg*
BY
ATTORNEYS Patented Dec. 11, 1934

1,984,039

UNITED STATES PATENT OFFICE 1,984,039

CHANGE SPEED GEARING

Karl Sieg, Philadelphia, Pa., assignor to Samuel M. Langston Co., Camden, N. J., a corporation of New Jersey Application December 14, 1932, Serial No. 647,161

18 Claims. (Cl. 74—341)

The invention relates to speed change gearing for selectively varying the speed ratio between driving and driven members.

One object of the invention is to secure a very large number of speed changes between the driving member and the driven member in a speed change gearing, by the use of a comparatively small number of gears.

A further object is to permit of the securing of successive changes in speed ratios in very small but definite increments through a comparatively wide range of speeds of the driven member.

A further object is to provide change speed gearing whereby a driven member may be driven from a driving member coaxial therewith and at any one of a plurality of predetermined relative speeds differing from each other by definite but very small amounts, whereby slight but accurate adjustments may be made of the speed of the driven member.

As one important feature of my invention I provide a plurality of shiftable gear elements operating in series in the gear train, and one or more operable to effect a series of comparatively slight speed changes, and one or more operable to effect a series of very much greater speed changes, whereby one may secure any desired speed within very close limits throughout the entire range of the apparatus by proper combination of adjustments of the shiftable elements.

As a further important feature I provide simple and easily operable means for effecting adjustment of the shiftable elements, whereby the necessary adjustments may be quickly and accurately made to secure any desired speed.

As a further important feature I provide adjustment indicating means associated with the adjusting members, whereby while the apparatus is running and the driven member is operating at one speed said means may be accurately set in positions indicating the adjustments to be made for the next operation at a different speed. Upon interrupting the application of power to the driven member, the adjustments may be quickly made by bringing the adjusting members into registry with the indicating means and the power reapplied. Thus the shut-down is greatly reduced and accurate selection of adjustments for any given speed is secured.

Although my invention may be incorporated in speed change gearing adapted for various purposes and for use in connection with many different types of machines, the specific form hereinafter described has been designed for use in connection with a machine having a traveling cut-off for subdividing continuously advancing stiff sheet material into sections. The material, such for instance as double faced corrugated paper, may be manufactured and advanced at any speed desired and the frequency of cutting operations of the cut-off set, by adjustment of the speed change gearing, to cut the material into sections of any desired length between selected extremes. In the specific form illustrated one extreme is four times that of the other, such as 18 inch minimum and 72 inch maximum. Between such limits over 4000 different definite and accurate lengths are possible, and sections may be cut within an average of less than .01 of an inch of any selected length. By changing the speed ratio of the sheet feeding drive shaft and the gearing drive shaft these limits may be raised or lowered as desired, for instance to a 36 inch minimum and a 144 inch maximum with an average departure of less than .02 of an inch from any length within those limits. The necessary adjustments from one speed to another may be made in from 15 to 20 seconds.

When using my improved speed changing gearing for driving a cut-off, accurate cutting of any selected length may be secured without need for the usual clutch, brake, target and other related parts, greater accuracy of cut is possible, and there is less wear, strain and shock on the operating parts due to the continuous rather than intermittent actuation of the cut-off.

It will be obvious that in carrying out my invention, either as a whole or in the various novel sub-combinations of useful parts thereof, various changes may be made depending upon the number and character of the speed changes desired, the difference between consecutive speeds, and the character of the mechanism or machine in connection with which the gearing is to be used, all within the scope of my invention as defined in the appended claims.

The mode of operation and the details of construction of one embodiment of my invention will be better understood by reference to the following description taken in connection with the accompanying drawings.

In these drawings:

Fig. 1 is a top plan view of a speed change gearing embodying my invention.

Fig. 2 is a side elevation of my improved speed change gearing.

Fig. 3 is a section taken on the line 3—3 of Fig. 2, one of the control members being shown in section on the line 3a—3a of Fig. 2.

Fig. 4 is a section taken on the line 4—4 of Fig. 2.

Fig. 5 is a section taken on the line 5—5 of Fig. 2.
Fig. 6 is a section taken on the line 6—6 of Fig. 3.
Fig. 7 is a section taken on the line 7—7 of Fig. 4.
Fig. 8 is a section taken on the line 8—8 of Fig. 5.
Figs. 9 and 10 are sections taken on the lines 9—9 and 10—10 respectively of Fig. 5, and
Fig. 11 is a section, the left hand end of which is taken on the line 11a—11a of Fig. 10, and the right hand end of which is taken on the line 11b—11b of Fig. 9.

My improved speed change gearing in the specific form shown in the drawings includes a plurality of units mounted in the same casing, and each having coaxial driving and driven members. The units are mounted with their axes parallel, and they are so juxtaposed that the power is directly transmitted from the driven member of each unit to the driving member of the next. Thus the units are in series and the driving member of the first unit and the driven member of the last may constitute the input and the output members of the gearing. Power may be introduced at either end although it is preferable to have the shifting means for producing the wider variations nearest to the output end. Each unit includes a shaft having its axis parallel to that of the driving and driven members of the unit, and by means of movable gears the power may be transmitted from the driving member to said shaft and from said shaft back to the driven member. By varying the position of the gears the speed of the driven member may be varied in respect to that of the driving member.

I have illustrated three units in the series, one for giving comparatively slight speed variation in a narrow range, one greater variation in a wider range, and the third still wider variations and a still wider range. By selecting different combinations of the various possible adjustments for the different units, a very great number of different relative input and output speeds may be secured, and very slight but definite and accurate adjustments may be made at any point between the extremes.

As the units are in series they may be arranged in any order, and therefore in describing them as the first, second or third unit, I refer only to the order in which they are mounted in the form illustrated and not to any essential order so far as the invention is concerned. A larger or smaller number of units may be employed.

All of the units are mounted in the same casing 10 in which is journaled the input shaft 11 and the output shaft 12. The first unit in the casing at the lower end of Fig. 1, the right hand end of Fig. 2 and shown in section in Fig. 3, receives power from the input shaft 11 which is driven from any suitable source of power, for instance through a pulley 13, while the third unit drives the output shaft 12.

In the first unit there are two stepped cone gears on the input shaft, one keyed thereto and the other rotatable thereon and connected to a driven member in the form of a gear 14. The pitch of the two stepped cones is the same so that one gear of a pair of connected, axially spaced and axially and laterally movable transmission gears may be brought into mesh with any gear of one stepped cone and the other gear of the said pair will be automatically in mesh with a corresponding gear of the other stepped cone. By making the number of teeth of the end gear of one stepped cone only slightly less than the number of teeth of the corresponding end gear of the other stepped cone and making the number of teeth on the two stepped cones decrease or increase from the larger end to the smaller end by the same arithmetical ratio, each axial shift of the pair of transmission gears from meshing engagement with one gear of each stepped cone to the next gear thereof, will produce a slight but definite change in the speed ratio of the driving and driven members.

By making the two transmission gears with the same number of teeth as the gears of the corresponding stepped cones and with which they mesh at one point in the range of axial movement of the transmission gears, the driven member may be rotated at the same speed as the driving member.

As shown the input shaft 11 is journaled in opposite sides of the casing and carries two stepped cone series of gears 15 and 16. The gears 15 are keyed on the shaft while the gears 16 are keyed on a sleeve 17 which is rotatably mounted on the shaft. This sleeve extends beyond the smaller end of the gear series 16 and has keyed thereto the driven gear 14. The two gear series include the same number of steps or gears, the cones taper in the same direction and at the same angle, and the distances between the corresponding gears of the two series are constant.

For driving one series of gears 16 from the other, there is provided a pair of coaxial rigidly connected transmission gears 20 and 21 movable axially in a direction substantially parallel to the axis of the stepped cone gears and also movable towards and from said axis to bring said gear 20 into mesh with any gears of the gear series 15 and to bring the gear 21 into mesh with the corresponding gear of the other series in accordance with the desired speed ratios. In the specific form shown, the gears 20 and 21 are connected to opposite ends of a sleeve 22 and spaced an amount equal to the distance between corresponding gears of the series 15 and 16. This sleeve 22 is freely rotatable on a supporting rod 23 mounted in the casing 10, there being suitable anti-friction bearing between the two.

As an important feature of the present invention the number of teeth in the gears of the two series is so proportioned that the relative rates of rotation of said series may be varied by very small increments. For that purpose, the number of teeth on the successive gears of both series varies in arithmetical progression by a small number of teeth, as for instance one tooth. For the purpose of illustration, the gear series 15 includes nine gears 25, 26, 27, 28, 29, 30, 31, 32 and 33 having 70, 69, 68, 67, 66, 65, 64, 63 and 62 teeth respectively. The second series of gears 16 includes nine gears 34, 35, 36, 37, 38, 39, 40, 41 and 42 having 72, 71, 70, 69, 68, 67, 66, 65 and 64 teeth respectively. Thus the number of teeth on the successive gears of both series varies in the same arithmetical progression, the number of teeth in each gear of each series differs by a constant from the number of teeth of the adjacent gear, and the difference in the number of teeth in any one gear of one series and the corresponding gear of the other series is another constant, and the gears of one series are of the same pitch diameters as the corresponding gears of the other series. The gears 20 and 21 have the same number of teeth as the gears 25 and 34 respectively, that is, 70 and 72 and are of the same pitch diameters so that they will simultaneously mesh with corresponding gears of both series when moved into selective operating position.

For convenience in manufacturing, pairs of successive gears may be made from a single blank. For instance, the pairs of gears 25 and 26, 28 and 29, 30 and 31, and 32 and 33 may be formed from single blanks. Similarly pairs of gears of the series 16 may also be formed from single blanks as shown.

In the position shown in Fig. 3, the gear series 15 and 16 are driven at the same speed. If the gears 20 and 21 are moved one step towards the right so as to mesh with gears 26 and 35 respectively, the driven series 16 will turn $$\frac{69}{70} \times \frac{72}{71}$$

of a revolution for each complete turn of the driving series 15. If the gears 20 and 21 are made to mesh with gears 33 and 42 respectively, the driven gear series 16 will be rotated through $$\frac{62}{70} \times \frac{72}{64}$$

of a revolution for each turn of the driving series 15. Thus the relative rates of rotation of the series 15 and 16 may be varied by very small increments.

The means illustrated in Figs. 1, 2, 3 and 6 for moving the gears 20 and 21 axially into alignment with any pair of corresponding gears of the series 15 and 16 include a hand wheel 45 above the casing 10 and connected to a vertical spindle 46 carrying at its lower end a pinion 47. This pinion 47 meshes with a rack 48 parallel to the rod 23 and connected to a slide 50, guided between the top of the casing 10 and a closure member 51. The slide 50 is connected to the sleeve 22 by a depending yoke or bracket 52 extending into a groove formed between a pair of axially spaced flanges 53 encircling said sleeve 22.

The hand wheel 45 may be rotated to any selected position to move the slide and sleeve endwise and bring the gears 20 and 21 into alignment with any pair of corresponding gears of the two gear series 15 and 16. In order that the position of the gears 20 and 21 may be accurately determined there is provided a plate 56 connected to the closure member 51 by a boss serving as a bearing for the spindle 46, and having fixed thereto an index ring 57 having nine indications or indices 58 on the periphery thereof corresponding to the gears of the two series 15 and 16. The pinion 47 is of such size that a rotation of the hand wheel 45 from the first to the last indice carries the gears 20 and 21 a distance equal to the distance between the end gears of each series 15 and 16.

The hand wheel 45 may be locked in any selected position corresponding to the indications 58, by a locking pin 62 slidable in a bore 61 of a boss 60 on the wheel and provided with a knob 63. The pin and bore are provided with shoulders 64 and 65 between which is disposed a coil spring 62 encircling the pin and urging the locking pin downwardly into any one of a series of apertures 67 passing through the plate 56 and positioned opposite the indications 58.

In order to facilitate the setting of the hand wheel for the next adjustment and while the gearing is in operation, there is provided a ring 70 engaging the index ring 57, rotatable with respect thereto, and having a pointer 71 indicatively cooperating with the indices 58. The ring 70 may be rotated to the selected position while the machine is operating, and as soon as the machine stops the knob 63 may be pulled up and the hand wheel rotated to bring the knob opposite the pointer and the gears will be ready for the next meshing operation.

The gears 20 and 21 can be moved axially to selected positions only when moved laterally out of meshing engagement with the gear series 15 and 16. To effect this movement, the rod 23 has eccentrically disposed journals 75 and 76 at opposite ends thereof, mounted in the casing 10. Means are provided for effecting the eccentric rotation of the rod 23 with respect to the axes of these journals. As shown the journal 75 has connected thereto a handle 78 (Figs. 2 and 3), the outer or free end of which carries means whereby said handle may be locked in any selective position, corresponding to the three sets of pitch diameters of the gears of the series 15 and 16, with which it is desired to mesh the gears 20 and 21.

The locking means includes a fixed plate 80 having a series of apertures 81. This plate 80 carries a member 82 having a series of indices 83 at the outer end thereof opposite said apertures and corresponding to the gears of the series 15 and 16. The free end of the handle 78 carries a boss 85 having a spring-pressed locking bolt 86 which is urged into one of the apertures 81. The member 82 has a dovetail recess in which slides a member 88 to which is connected a pointer 89 indicatively cooperating with the indices 83.

If it is desired to change the position of the gears 20 and 21 so as to mesh them with any other pair of corresponding gears of the two gear series 15 and 16, the bolt 86 is withdrawn against the action of the spring to release said bolt from locking engagement with the plate 80, and the handle 78 turned to move the gears 20 and 21 out of mesh with the gears of the series 15 and 16. The hand wheel 45 is then rotated into any selected position to correspondingly move the gears 20 and 21 into alignment with the selected pair of corresponding gears of the two series 15 and 16. The handle 78 is then turned to move the gears 20 and 21 downwardly into meshing relationship with the aligned pair of corresponding gears of the two series. Since the gears of each series are stepped, it is necessary that gears 20 and 21 be moved different amounts corresponding to the pitch diameter of the gears of the two series. I have found that the number of eccentric positions to which the gears 20 and 21 may be moved to bring them in mesh with the gears of the series 15 and 16 may be materially reduced if the gears differing only by one or two teeth are made of the same pitch diameter. This construction does not materially affect the engagement of the gears 20 and 21 with these gears. For instance, I have divided the gears of each series into three successive sets of three gears, the gears of each set being the same pitch diameter. The handle 78 thus has only three gear meshing positions corresponding to the three sets of gears of the series, and only three spaced apertures 81 corresponding to these positions are necessary.

In order to prevent any accidental meshing of a gear 20 or 21 with two gears of either stepped cone series at the same time, the sleeve 22 is provided with a flange 90 extending beyond the outer periphery of the gear 20 and adapted to be inserted in any one of a series of annular grooves 91 between successive gears of the series 15. This flange 90 must be moved out of its groove 91 before the sleeve can be moved axially, and the gears cannot be brought into mesh unless the flange 90 be moved to a position opposite to and enters one of the grooves.

Where the speed change gearing is to be used with machines in which such very small increments of speed variation are not necessary, the first unit above described may be omitted, or the difference in the number of adjacent teeth of the stepped cone gears may be increased to two, three or larger number. If the first unit is omitted the driving member of the second unit may be the input shaft or directly connected thereto. Where the first and second units are employed they preferably have the axes of their respective gears parallel and the power is directly transmitted from the gear 14 of the first unit to a gear 100 of the second unit.

The second unit, in the form shown particularly in Figs. 4 and 7, is very similar in construction and operation to the first unit, but provides successive increments of speed variation, each of which may be approximately equal to the total speed variation produced by the first unit.

In the second unit, as shown, there are coaxial driving and driven members in the form of gears 100 and 101 and gearing for the transmission of power from one to the other. The driving gear 100 meshes with the gear 14, both having the same number of teeth, for instance 84.

Coaxial with the gears 100 and 101 are two series of stepped gears 102 and 105, each in the form of a stepped cone, and each cone comprising eight gears. The gear series 102 and the gear 100 are connected to a sleeve 103 rotatably mounted on a shaft 104 suitably journaled in the casing 10. The gear series 105 and the gear 101 are keyed or otherwise connected to the shaft 104.

Transmission of power is effected between the two series of gears 102 and 105 by means of a pair of coaxial gears 106 and 107 connected to a sleeve 108 rotatably mounted on a rod 109 parallel to the shaft 104 and movable axially along the rod 109 by means of a hand wheel 45a (see Figs. 4 and 7) similar to that described for axially moving the gears 20 and 21. This wheel 45a can be locked to a plate 56a in one of eight positions corresponding to the gears of the series 102 and 105.

The rod 109 and the gears 106 and 107 may be moved towards and from the shaft 104 by means similar to that described for eccentrically moving the rod 23 and the gears 20 and 21. For that purpose, the rod 109 is eccentrically disposed in respect to journals mounted in the casing 10 and is rotated by means of a control handle 78a to any one of a number of positions with respect to the axis of the shaft 104 in accordance with the diameter of the pair of gears of the series 102 and 105 with which it is desired to mesh the gears 106 and 107. The handle 78a may be locked to a plate 80a in any of the positions indicated by indices 83a by means of a locking bolt 86a in a manner similar to that heretofore described.

The series of gears 102 comprises gears 110 to 117 inclusive, and the series of gears 105 comprises gears 118 to 125 inclusive, and each series is divided into three successive sets of gears, the gears of each set having equal pitch diameters. The gears 110, 111 and 112 constitute one set; the gears 113, 114 and 115 constitute a second set; and the gears 116 and 117 constitute a third set. The gears of the series 105 are similarly divided into three sets. By means of this arrangement, the gears 106 and 107 need be eccentrically moved into only one of three positions to bring them into mesh with any aligned gears of the series 102 and 105, so that three locking positions for the handle 78a is provided. Also for convenience in manufacturing, the gears are made in pairs from a single blank as shown.

The sleeve 108 is provided with a flange 90a which is made to extend into any one of the annular grooves 91a between adjacent gears of the series 105 to insure proper alignment for meshing.

The two series of gears 102 and 105 have a relationship similar to the relationship between the two series of gears 15 and 16. That is, both series 102 and 105 include the same number of steps or gears with the same axial spacing.

In order to obtain variations of speed ratios in small increments, the successive gears of both series 102 and 105 vary in arithmetical progression by one tooth. For the purpose of illustration, in the gear series 102 the gears 110, 111, 112, 113, 114, 115, 116 and 117 have 78, 77, 76, 75, 74, 73, 72 and 71 teeth respectively, and the series 105 includes eight gears 118, 119, 120, 121, 122, 123, 124 and 125 having 104, 103, 102, 101, 100, 99, 98 and 97 teeth respectively. The gears 106 and 107 have the same pitch diameter and for the purpose of illustration have 88 and 66 teeth respectively. Furthermore, the gears of one series are of the same pitch diameters as the corresponding gears of the other series so that the gears 106 and 107 will be simultaneously in mesh with corresponding gears of the series 102 and 105 when said gears 106 and 107 are moved into selective operating position.

It will be noted that whereas in the first unit the difference in the number of teeth of the transmission gears 20 and 21 is only 2 and the driving one of the pair is at the left hand end and has the smaller number of teeth, in the second unit the difference in the number of teeth of the transmission gears 106 and 107 is 12 and the driving one of the pair is at the right hand end and has the smaller number of teeth. In the first unit the largest gear of the driving stepped cone series 15 has 70 teeth and the largest gear of the driven stepped cone series 16 has 72 teeth (a difference of two teeth with larger number on the driven cone) whereas in the second unit the largest gear of the driving series 102 has 78 teeth and the largest gear of the driven series has 104 teeth (a difference of 26 teeth with the larger number on the driven cone).

In the position shown in Fig. 4, the series of gears 102 and 105 are driven at the same speed as the ratio of 66 to 78 is the same as the ratio of 88 to 104. If the gears 106 and 107 are moved so as to mesh with gears 119 and 111 respectively, the series 105 will be driven at $$\frac{77}{66} \times \frac{88}{103}$$

the speed of the series 102. If the gears 106 and 107 mesh with the gears 125 and 117 respectively the series 105 will be drived at $$\frac{71}{66} \times \frac{88}{97}$$

the speed of the series 102. By means of the second unit, the relative rates of rotation of the series 102 and 105 will be varied by small increments, each of which is approximately equal to the sum total of the increments of the first unit.

The third unit, which is mounted in the same casing, is similar to the first and second units to the extent that it includes two coaxial driving and driven series of gears of the stepped cone type and separate shiftable transmission gears for driving one series from the other in any one of a plurality of different gear ratios. The increments of speed ratio of the third unit are very much larger than those of the first and second units, and certain of them are approximately equal to the sum total increments of the first and second units combined. To provide for such larger increments, a somewhat different type of transmission gearing is employed.

In the form shown particularly in Figs. 5 and 8 to 11 inclusive, there is employed a driving member in the form of a gear 120 adapted to mesh with the driven gear 101 of the second unit and having the same number of teeth. This driving gear 120 of the third unit is coaxial with, but relatively rotatable in respect to the output shaft 12.

The driving gear 120 is keyed to a shaft 121 journaled between one side of the casing 10 and a bearing standard 122 disposed intermediate the sides of said casing. Also keyed to the shaft 121 is a series of gears 123 forming a stepped cone. Rotatably mounted with respect to the gear series 123 and coaxial therewith is a second series of gears 124 also forming a stepped cone which may, if desired, be stepped in opposite directions from the series 123. This series is keyed to the output shaft 12 which is journaled in the side of the casing 10 and the bearing bracket 122 and coaxial with the shaft 121.

In order to transmit power from any one of the gears of the series 123 to any one of the gears of the series 124, there are provided two sets of gears 125 and 126 which are independently movable axially of a transmission shaft 127 and interconnected by said shaft for the transmission of power therebetween. This shaft 127 is journaled intermediate of its ends in the bearing standard 122 and at the ends in the sides of the casing 10 is disposed parallel to the shafts 12 and 121.

The gear set 125 shown at the left of Figs. 5 and 11 and in end elevation in Fig. 10, includes a gear 128 cooperating with the gear series 123 and slidable on the shaft 127 which is formed with a fluted surface to insure rotation with said gear while permitting said gear to slide therealong.

For transmitting power between any one of the gears of the series 123 and the gear 128, there is provided an intermediate idler gear 130 meshing with the gear 128 and movable towards and away from the gear series 123 and lengthwise thereof to bring said gear 130 in mesh or out of mesh with any gear of the series 123 aligned therewith. For that purpose, a bracket or gear carrier 131 is supported on the hub of the gear 128 through anti-friction bearings 132 and swingable about the shaft 127 as a center. The gear 130 is carried by the bracket 131 on anti-friction bearings 133 so positioned that the gears 128 and 130 are constantly in mesh and axially movable together.

For swinging the bracket 131 about the shaft 127 said bracket presents a segment gear 135 coaxial with said shaft and meshing with an elongated pinion 136 in the form of a hollow sleeve on a rod 139 hereinafter referred to more particularly.

For rotating the pinion 136, there is connected to one end thereof a control lever 137 (see Fig. 11) having a boss 138 at the outer end thereof for receiving a spring-pressed locking bolt 140. One end of said bolt carries a knob 141 and the other end is adapted to pass through one of a number of apertures 142 (see Fig. 2) in a fixed locking plate 143. Mounted on the outer end of the plate 143 is a member 145 having a series of indices 146 opposite the apertures and corresponding to the pitch diameters of the gears of the series 123. Slidable along the member 145 is a pointer 150 indicatively cooperating with the indices 146.

Means similar to those already described for effecting the slidable movement of the gears 20 and 21, are provided for sliding the gear set 125 axially along the shaft 127 and the pinion 136. Said means, as shown in Fig. 8, include a hand wheel 152 connected to a spindle 153 carrying a pinion 154 which meshes with a rack 155. The rack 155 carries a lug or yoke 156 extending into a groove formed between a pair of flanges 157 formed in the outer periphery of the bracket 131. The bracket 131 does not rotate but only oscillates so that the groove need not extend around the entire periphery but is only arcuate.

The hand wheel 152 may be locked in any one of a number of positions corresponding to the gears of the series 123, by means of a spring-pressed locking bolt 158 adapted to pass through apertures 159 in a fixed locking plate 160.

The second gear set 126 of the third unit includes a change gear arrangement whereby the speed ratio between the shaft 127 and any one of the gears of the series 124 may be varied. In the specific embodiment shown, there is provided a gear set 126 somewhat similar to the gear set 125, and also slidable on the shaft 127 but independently of the gear set 125. This gear set 126 includes two gears 160 and 161 of different pitch diameter, connected together and directly slidable on the fluted shaft 127 and two intermediate gears 162 and 163 meshing with gears 160 and 161 respectively.

Means are provided for moving the intermediate gears 162 and 163 about the shaft 127 as a center to bring either one of said gears in mesh with any one of the gears of the series 124. As shown, said means includes a bracket or gear carrier 164 supported on the hub of the gears 160 and 161 through anti-friction bearings 165 and swingable about the shaft 127 as a center. Carried by the bracket 164 on anti-friction bearings 166 and 167 are the intermediate gears 162 and 163 respectively.

For swinging the bracket 164 about the shaft 127, said bracket presents a segment gear 168 coaxial with said shaft and meshing with an elongated pinion 170 along which said segment gear is adapted to slide and which pinion may be integral with the rod 139.

By making the pinion 136 on the rod 139, the control of the two pinions 136 and 170 may be coaxial and on the same side of the machine. The rod 139 has connected thereto means for rotating said pinion, which means includes a control handle 171 adapted to be locked in one of a number of places to a circular locking plate 172. The handle 171 has a boss 173 which receives a spring-pressed locking bolt 174, one end of which carries a knob 175, the other end being adapted to pass through one of a series of apertures in the plate 172. Connected to the periphery of the plate 172 is an index ring 176 carrying a number of indices 177 corresponding to the required combination between the gear series 124 and the intermediate gears 162 and 163. Slidable along the indices is a pointer 178.

For sliding the gear set 126 axially along the shaft 127, there is provided a hand wheel 178 similar in construction to the hand wheel 152, and serving to rotate a pinion 180 meshing with a rack 181 having a lug 182 engaging a groove in the bracket 164 in a manner already described with reference to the means for axially moving the gear set 125.

Since the gear sets 125 and 126 are independently movable into selective operative positions, the two stepped cone gear series 123 and 124 may include different numbers of gears. In the form shown, the gear series 123 includes six gears 184, 185, 186, 187, 188 and 189 having 82, 80, 78, 76, 74 and 72 teeth, respectively, and the gear series 124 includes five gears 190, 191, 192, 193 and 194 having 41, 48, 56, 65 and 75 teeth respectively. The pitch diameters of the gears in one of the series 123 and 124 need not bear any definite relationship to the pitch diameters in the other. The gears 128 and the gear 130 of the gear set 125 have 60 and 39 teeth respectively, and the gears 160, 161, 162 and 163 of the gear set 126 have 30, 60, 48 and 39 teeth respectively.

By means of this arrangement, the transmission gear set 125 may be moved axially and laterally to bring the gear 130 into engagement with any one of the six gears of the series 123 and locked in meshing position. The gears of the series 123 are arranged in groups of two having the same pitch diameters so that three different pitch diameters are represented in the series 123. The lever 137 is lockable into one of three positions corresponding to the different pitch diameters of the gears of the series 123.

The transmission gear set 126 may be moved axially and swung in either direction to effect engagement of either the gear 162 or the gear 163 with any one of the gears of the series 124. Since either of the gears 162 and 163 may be moved into mesh with any one of the gears of the series 124 and since the series 124 includes five gears of different pitch diameters, the segment gear 168 has ten operative positions into which it may be moved so that the index ring 176 carries ten indices 177 corresponding to said positions.

In the third unit, the gears, in the positions indicated in the drawings, will drive the output shaft at twice the speed of the driving gear 120, the gear ratio being $$\frac{82}{60} \times \frac{60}{41}.$$

By shifting the transmission gear set 126 one step to the right and bringing the gear 162 into mesh with the gear 190, the output shaft will be driven at the same speed as the driving gear 120, the gear ratio being $$\frac{82}{60} \times \frac{30}{41}.$$

By shifting both of the transmission gear sets 125 and 126 to the extreme right hand position in Fig. 5 and bringing the gear 162 into mesh with the gear 194 the output shaft will be driven at approximately one-half the speed of the driving gear 120, the gear ratio being $$\frac{72}{60} \times \frac{30}{75}.$$

As the first unit has a maximum driving speed of unity and a series of very small increments decreasing from unity, and as the second unit has a maximum speed of unity and a series of increments decreasing from unity, the sum of each such increment being equal to the total increments of the first unit, the shifting of the gears of the first, second and third units to the minimum speed will drive the output shaft at one-half the speed of the input shaft.

With the gear set 126 in any given position the transmission gear set 125 produces successive increments between successive positions, each of the increments being substantially equal to the sum total of the increments obtainable by the first and second units together, and roughly approximates the sum total of the increments of the second unit.

With the transmission gear set 125 in any given position and using only the gears 160 and 162 of the transmission gear set 126, successive axial movements of this transmission gear set will give increments, each of which is substantially equal to the sum total of the increments producible by the first and second units and the transmission gear set 125 of the third unit.

From the foregoing it will be seen that if the input shaft be driven at any specified rate, the output shaft may have a speed of one-half the input shaft or twice the input shaft, or any one of over 4000 intermediate speeds.

When using my improved transmission gearing for continuously driving a traveling cut-off and operating on a sheet advancing at a uniform speed, the time cycle of the cut-off may be set to cut the sheet at varying lengths between two extremes, one of which is four times that of the other. In advancing the sheet at such rate that these extreme lengths are between 18 inches and 72 inches, a shift of the transmission gearing of the first unit one step will produce a change in the sheet length of approximately .008 inches, a shift of the transmission gearing of the second unit will give a change of the sheet length of approximately .07 inches, and a shift of the transmission gearing 125 of the third unit will give a change of approximately one-half inch in the sheet length, or a total change in sheet length of approximately three inches.

A shift of the transmission gearing 126 one step, using the gear 160, produces a change in sheet length of approximately 3½ inches. Using the gear 161, sheet lengths may be obtained between 18 inches and 36 inches, and using the gear 160 sheet lengths between 36 inches and 72 inches may be obtained.

The variations in sheet length above referred to are based upon an 18 inch minimum and a 72 inch maximum. If the drive between the transmission gearing and the cut-off be of a different ratio as to produce lower or higher minimum and maximum lengths, the variations produced by successive changes in the different units will be correspondingly modified.

A complete change involving the setting of the eight levers and hand wheels may be made in a very short time. In making such changes, a chart may be prepared showing all of the large number of possible and proper positions of the levers and hand wheels for each such length.

In order to facilitate the settings, all of the indices cooperating with the hand wheels range in sequences. For instance, the indices 58 cooperating with the hand wheel 45 range from 1 to 9; the indices cooperating with the hand wheel 45a range from 10 to 17; the indices cooperating with the hand wheel 152 range from 18 to 23; and the indices on the hand wheel 178 range from 24 to 29. The indices cooperating with the hand levers corresponding to the hand wheels range in the same sequences as those on the corresponding hand wheels so that the same settings are made on the levers as are made on the hand wheels. For instance, the indices 83 range from 1 to 9 corresponding to the indices on the hand wheel 45; the indices on the plate 80a range from 10 to 17 corresponding to the indices cooperating with the hand wheel 45a; the indices 146 range from 18 to 23 corresponding to the indices cooperating with the wheel 152; and the indices 177 range from 24 to 29 corresponding to the indices cooperating with the wheel 178.

Since either one of the pair of gears 162 and 163 may be made to mesh with one of five gears of the series 124, the lever 171 is movable into one of 10 corresponding positions, the positions being designated as "top" and "bottom" according to whether the gear 162 or the gear 163 is required to mesh with one of the gears of the series.

While the machine is running, the settings for the next operation may be made by moving the pointers to the particular indices required for the next operation. Then the machine is shut down and the next operation made very quickly by merely moving the levers and hand wheels into positions corresponding to the set positions of the pointers.

Having thus described my invention, what I claim as new and desire to secure by Letters Patent is:

1. A speed change gearing including two pairs of coaxial relatively rotatable series of gears, the axis of one pair of series being parallel to the axis of the other pair of series, each series forming a stepped cone, and one series of each pair constituting a driving member, and the other series a driven member, driving connections between the driven member of one pair and the driving member of the other pair, gearing connecting one driving member to its coaxial driven member, and operable to vary the driving to driven ratio by a series of predetermined, definite, substantially equal increments, and gearing connecting the other driving member to its coaxial driven member, and operable to vary the driving to driven ratio by another series of predetermined, definite and substantially equal increments, the sum total of the increments of one of said gearings being substantially equal to a single increment of the other of said gearing.

2. A speed change gearing including two pairs of coaxial relatively rotatable series of gears, the axis of one pair of series being parallel to the axis of the other pair of series, each series forming a stepped cone, and one series of each pair constituting a driving member, and the other series a driven member, gearing connecting the driven member of one pair to the driving member of the other pair, a pair of coaxial gears held against relative rotation for connecting one driving member to its coaxial driven member, and adjustable for varying the driving to driven ratio by a series of predetermined, definite, substantially equal increments, and a pair of coaxial gears held against relative rotation for connecting the other driving member to its coaxial driven member and adjustable for varying the driving to driven ratio by another series of predetermined, definite and substantially equal increments, the sum total of the increments obtainable from one of said first mentioned pairs being substantially equal to a single increment obtainable from the other of said first mentioned pairs.

3. A speed change gearing including two parallel shafts, each having a sleeve rotatable thereon, and each sleeve and each shaft having a separate series of gears in the form of a stepped cone, separate shiftable power transmitting elements for transmitting power between the stepped cone on each shaft and the stepped cone on the sleeve of the corresponding shaft, and at any one of a series of predetermined substantially equal increments, the sum of the increments of one of said elements being substantially equal to a single increment of the other element, and gearing connecting one of the stepped cones coaxial with one shaft to one of the stepped cones coaxial with the other shaft.

4. A speed change gearing including two parallel shafts, a separate series of gears in the form of a stepped cone keyed to each shaft, a separate series of gears in the form of a stepped cone rotatable on each shaft, a shiftable power transmitting element for transmitting power at different predetermined gear speed ratios between the stepped cone keyed on each shaft and the stepped cone rotatable on the same shaft, the maximum range of speed adjustment effective through the shifting of one of said elements being substantially equal to the minimum speed change effective through any adjustment of the other element, and gearing connecting one of the stepped cones on one shaft and one of the stepped cones on the other shaft.

5. A speed change gearing including two coaxial relatively rotatable series of gears, each forming a stepped cone, said cones being tapered in the same direction and at the same angle, a pair of coaxial gears rigidly connected together and axially spaced to a distance substantially equal to the distance between the larger gear of one cone and the larger gear of the other, and means for moving said pair of gears to bring one gear into mesh with any gear of one stepped cone and the other into mesh with the corresponding gear of the other stepped cone.

6. A speed change gearing including two coaxial relatively rotatable series of gears, each forming a stepped cone, said cones being tapered in the same direction and at the same angle, gearing for transmitting power from one stepped cone to the other, including a plurality of gears, means for moving one of said gears into mesh with any gear of one of said stepped cones, and connecting means for simultaneously and automatically moving another of said plurality of gears into mesh with the corresponding gear of the other stepped cone.

7. A speed change gearing including two separate, coaxial, relatively rotatable series of gears, each forming a stepped cone, said cones tapering in the same direction, and a pair of coaxial rigidly connected gears movable axially in a direction parallel to the axes of said series of gears and bodily movable toward and from said axes, whereby one of said pair of gears may mesh with any one of the gears of one series and the other of said pair engage with the corresponding one of the gears of the other series.

8. A speed change gearing including two separate, coaxial, relatively rotatable series of gears, each forming a stepped cone, said cones tapering in the same direction, each gear of one series being of substantially the same diameter as the corresponding gear of the other series, and a pair of coaxial rigidly connected gears movable axially in a direction parallel to the axes of said series of gears and bodily movable toward and from said axes for transmitting power from any gear of one series to the corresponding gear of the other series.

9. A speed change gearing including two separate, coaxial, relatively rotatable series of gears, each forming a stepped cone, said cones tapering in the same direction, the number of teeth on the successive gears of both series varying in the same arithmetical progression, and a pair of coaxial, rigidly connected gears movable axially in a direction parallel to the axes of said series of gears, and bodily movable toward and from said gears for transmitting power from any gear of one series to a corresponding gear of the other series.

10. A speed change gearing including a pair of coaxial series of gears, each forming a stepped cone, said cones tapering in the same direction, a shaft parallel to the axes of said gears, a sleeve rotatable on said shaft and slidable axially therealong, and a pair of gears secured on said sleeve and spaced a fixed distance apart, one adapted to mesh with a gear of one of said series and the other with a gear of the other of said series.

11. A speed change gearing including a pair of coaxial series of gears, each forming a stepped cone, said cones tapering in the same direction, a pair of coaxial gears having their axes parallel to said first mentioned gears, means for moving said pair axially as a unit, and separate means for moving said pair laterally, whereby one of said pair may mesh with any gear of one series and the other with the corresponding gear of the other series.

12. A speed change gearing including a pair of series of coaxial gears, each forming a stepped cone, said cones tapering in the same direction, a bar parallel to said gears and having eccentric bearings, and a sleeve slidable lengthwise of said bar and having two gears rigid therewith, one for receiving power from any gear of one of said series and the other for transmitting power to the corresponding gear of the other series.

13. A speed change gearing including a pair of series of coaxial gears, each forming a stepped cone, said cones tapering in the same direction, a shaft parallel to the axes of said gears, and having eccentric bearings, a sleeve slidable lengthwise of said shaft and having two gears rigid therewith, one for receiving power from any gear of one series and the other for transmitting power to the corresponding gear of the other series, a rack bar parallel to said shaft, a bracket secured to said bar and engaging said sleeve to move the latter endwise, and a pinion for moving said rack bar endwise.

14. A speed change gearing including a pair of separate, coaxial, relatively rotatable series of gears forming stepped cones, a pair of coaxial gears held against relative rotation and relative axial movement and having their axes parallel to the axes of said stepped gears, and means for causing one of said pair of gears to be driven by any one of the gears of one series and the other gear of said pair to drive the corresponding one of the other series, the gears of said pair being of substantially the same diameters but having different numbers of teeth.

15. A speed change gearing including a series of gears forming a stepped cone, a shaft having its axis parallel to the axes of said gears, a gear slidable on said shaft but held against rotation in respect thereto, a bracket mounted to swing about said shaft as a center and slidable with said gear along said shaft, and presenting a segment gear coaxial with said shaft, an elongated pinion with which said segment gear meshes and along which it may slide, said pinion being rotatable to swing said bracket, and a pinion carried by said bracket and meshing with said gear and bodily movable into or out of mesh with any one of said series of gears.

16. A speed change gearing including a pair of separate coaxial relatively rotatable series of stepped gears constituting driving and driven elements, a shaft, a pair of gears slidable on said shaft and keyed thereto, a pair of brackets, one associated with each of said gears and slidable therewith and mounted to swing about said shaft as a center, said brackets having segment gears coaxial with said shaft, a pair of coaxial, elongated, relatively rotatable pinions meshing with said segment gears, and a pair of pinions, one carried by each bracket for meshing with the corresponding gear, one of said last mentioned pair being adapted to mesh with any one of the gears of one series and the other to mesh with any one of the gears of the other series, whereby power is transmitted from one series to the other through said shaft, said pair of gears and said pinions.

17. A speed change gearing including two separate, coaxial, relatively rotatable series of gears, each forming a stepped cone, a shaft, a pair of brackets pivoted thereon and each presenting a segment gear, a second shaft having an elongated pinion meshing with one of said segment gears, an elongated pinion rotatable on said second shaft and meshing with the other of said segment gears, independent means for rotating said second shaft and said elongated pinion, means for independently sliding said brackets along said first shaft, and gearing slidable with said brackets for transmitting power through said second shaft from any gear of one series to any gear of the other series.

18. A speed change gearing including a series of gears forming a stepped cone, a shaft having its axis parallel to said cone, a bracket mounted to swing on said shaft as a center and presenting a segment gear, a pair of gears of different sizes keyed on said shaft, said bracket having two arms, one on each side of said series of gears, a pinion on one arm meshing with one gear of said pair, a pinion on the other arm meshing with the other of said pair, said bracket and pair of gears being slidable along said shaft to bring either pinion into the plane of any gear of said series, and an elongated pinion meshing with said segment gear and rotatable for swinging said bracket in either direction to bring either of said first mentioned pinions into mesh with the gears of the series in the plane thereof.

KARL SIEG.